United States Patent [19]
Steinke

[11] Patent Number: 5,803,119
[45] Date of Patent: Sep. 8, 1998

[54] FLUID FLOW CONTROL DEVICE

[75] Inventor: Joseph H. Steinke, Mission Viejo, Calif.

[73] Assignee: Control Components Inc., Rancho Santa Margarita, Calif.

[21] Appl. No.: 915,902

[22] Filed: Aug. 21, 1997

Related U.S. Application Data

[63] Continuation-in-part of Ser. No. 598,004, Feb. 7, 1996, abandoned.

[30]      Foreign Application Priority Data

Feb. 8, 1995 [GB] United Kingdom .................... 9502445

[51] Int. Cl.⁶ ..................................................... F16K 47/00
[52] U.S. Cl. ....................................... 137/625.37; 251/127
[58] Field of Search ............................. 137/625.3, 625.37; 251/127

[56]           References Cited

U.S. PATENT DOCUMENTS 3,791,413  2/1974  Muller .
3,894,716  7/1975  Gayle .
3,908,698  9/1975  Baumann .
3,971,411  7/1976  Baumann .
4,125,129  11/1978  Baumann .

FOREIGN PATENT DOCUMENTS 412827  7/1910  France ............................... 137/625.3
2 360 023  2/1978  France .
2224269  6/1973  Germany ............................ 137/625.3

Primary Examiner—John Fox
Attorney, Agent, or Firm—Pillsbury Madison & Sutro LLP

[57]              ABSTRACT

A fluid flow control device, sometimes called a variable fluid restrictor control valve or severe service control valve. These valves employ a moveable plug and are used to control high pressure fluids e.g. superheated steam. The valve of the invention provides axial flow passageways for the fluid, which have right-angled turns. The passageways are either on the radially outer surface of the plug or within an annular sleeve through which the plug is moveable.

7 Claims, 4 Drawing Sheets

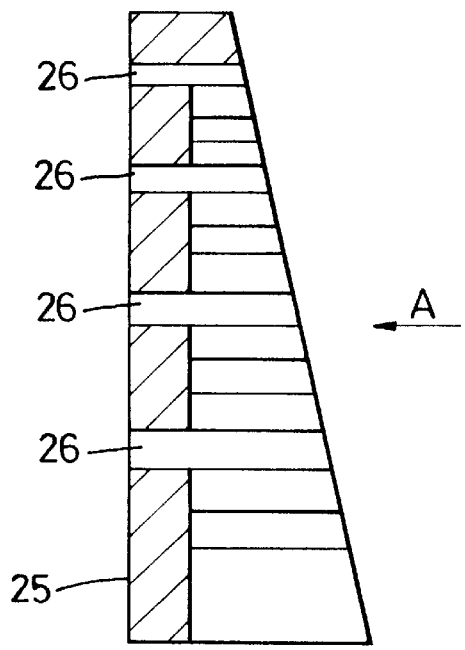
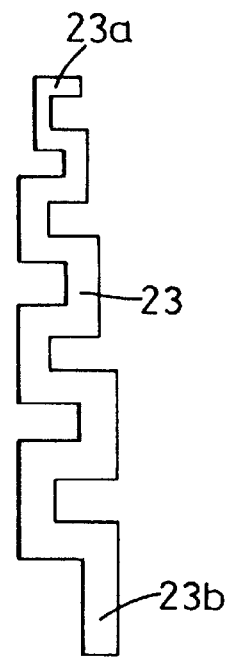
Fig. 5        Fig. 6
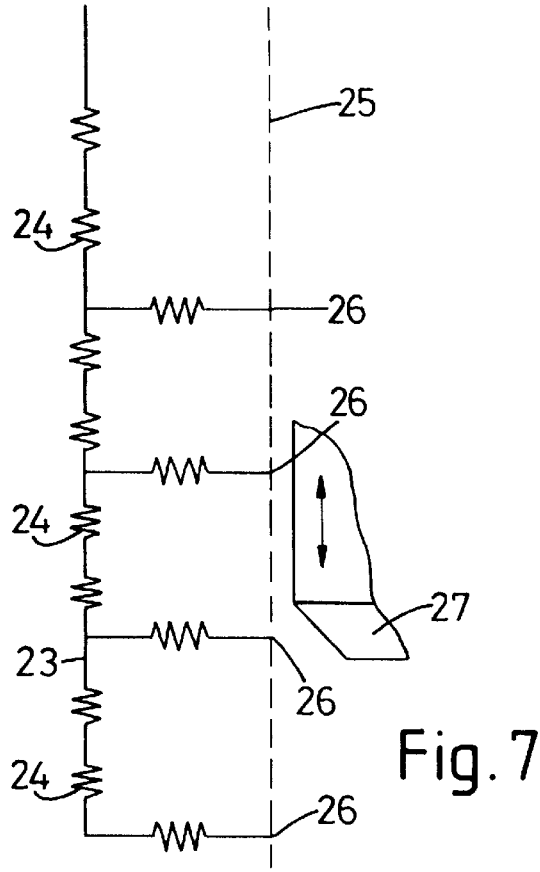
Fig. 7
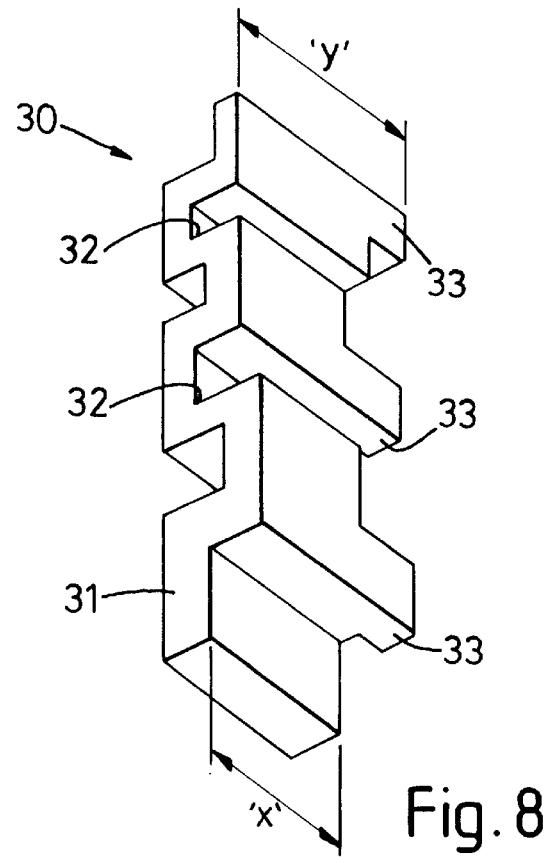
Fig. 8

FLUID FLOW CONTROL DEVICE

This is a continuation-in-part (CIP) of application Ser. No. 08/598,004, filed on Feb. 7, 1996, which was abandoned upon the filing hereof Aug. 21, 1997.

FIELD OF THE INVENTION

This invention relates to a fluid flow control device. It may be used to control the flow of liquids or gases and may, for example, be used to provide velocity control of high pressure flowing fluids. Devices of this general type are sometimes known as variable fluid restrictor control valves, and are exemplified by Self U.S. Pat. Nos. 3,451,404 and 3,514,074 which have frictional passageways, and by Self U.S. Pat. No. 3,513,864 which has multiple abrupt, angular turn passageways.

BACKGROUND OF THE INVENTION

In the handling of flowing high pressure fluids, it has been customary to utilise orifice means having a high velocity short throat section to attain energy losses or high pressure drops. If the fluid is in a liquid state and liable to flash, that is, vaporise or turn to a gaseous condition on the downstream side of the orifice or valve opening, it may condense implosively and induce damaging shock waves, cause erosion, and the like. Also, as the velocity of the fluid in the valve exceeds the velocity of the fluid in the line, several disturbing reactions occur. A most serious problem is rapid erosion of the valve surfaces by direct impingement of the liquid and any foreign particle suspended therein. Additional erosion results from cavitation. Cavitation may be defined as the high speed implosion of vapour against those internal parts of the valve controlling flow (the valve trim) and the valve body.

In addition to the severe problems resulting from erosion, the increased velocity also causes the flow characteristics of the valve to become unpredictable and erratic.

Other problems created by the high fluid velocity in the valve are severe noise generation, trim fatigue and possible degradation of flowing fluid materials such, for example, as polymers.

Fluid-borne noise downstream of control valves is often very high. If not treated or contained with the pipe, this noise can result in sound pressure levels of 110 to 170 dB three feet from the valve exit. Sound sources of this magnitude are hazardous to personnel and frequently result in complaints from local residents.

Mufflers and silencers can typically only attenuate fluid-borne noise 20 to 30 dB. Therefore, only partial success has been achieved with them in obtaining desired sound pressure levels.

Furthermore, a typical path treatment system ie, the muffler, lagging support structure etc is very cumbersome and expensive, often, the total cost of path treatment for noise can exceed the valve cost many times over.

In order to overcome or ameliorate the above problems, there have been introduced devices which effect energy losses in high pressure fluids without increasing velocity and shock wave reaction by sub-dividing the flow into a plurality of small, long passageways with abrupt turns creating friction and pressure drop in the fluid, thus avoiding damage and erosion in the equipment. Such a device is disclosed, for example, in U.S. Pat. No. Re 32197. There, the passageways are provided in an annular stack of separate members having abutting faces enclosing a plurality of individual passageway grooves which are angular between the inlet and outlet of the stack to turn the fluid and to provide a substantially longer flow length than between the inlet and outlet ends of the stack. The stack is mounted in the fluid passage of a valve housing and a valve plug movable within the annular structure controls the number of passageways in the stack through which the fluid can flow.

A modified device of this type is disclosed in GB-A-2,273,579 in which at least one passageway in the stack of members of discs includes a void between the inlet and outlet region of the disc, the void expanding the cross-sectional area of the energy loss passageway.

Valves incorporating a flow control device including a stack of energy-loss passageways have become very successful commercially and it is an object of the present invention to provide an improvement in devices of this type.

SUMMARY OF THE INVENTION

Accordingly the invention provides a fluid flow control device comprising a plug and cylinder arrangement, the cylinder being annular and the plug being cylindrical and moveable axially within said cylinder, a fluid inlet co-operating with one end of said cylinder, a fluid outlet co-operating with the other end of said cylinder, a fluid flow path extending axially through the plug and cylinder arrangement and having a path entry of variable area, said fluid flow path having a plurality of circumferentially extending angular turns, and operating means for axially moving the plug relative to the cylinder, the arrangement being such that as the plug is moved axially the area of path entry available for fluid flow and the length of the fluid flow path is varied.

Conveniently, as the plug moves further out of the cylinder, a corresponding increase in fluid flow is obtained.

In one embodiment the axial flow paths with turns are provided as passageways formed as channels on the radially outer surface of the plug. With the device in a closed position, the fluid inlet at or adjacent one end of the cylinder is closed by the plug. As the plug is moved out of the cylinder the inlet is opened and fluid flow commences by communication between the inlet, the axial passageway(s) with turns on the plug and the outlet at or towards the other end of the cylinder. As the plug is gradually moved further out of the cylinder, the inlet leads into a gradually shortening length of axial passageways with turns so that the frictional effect of the turns is reduced. However, if desired, the passageways may increase in cross-section, ie in depth and/or width from the inlet to the outlet end of the plug so that an increase in flow rate is achieved at the same time as the decrease in friction.

In another embodiment the axial flow paths with turns are provided as passageways formed as channels in a sleeve forming an inner wall of the annular cylinder. The passageways communicate at a plurality of discrete openings, or radially directed passageways, along their length with the interior of the sleeve and a plug fits within the sleeve. An inlet is provided at or adjacent one end of the cylinder to communicate with the interior of the sleeve. When the plug is fully within the sleeve, flow to an outlet at or adjacent the opposite end of the cylinder to the inlet is closed off. As the plug is moved out of the cylinder and its sleeve, fluid flow through the device commences once the plug has exposed the first radially directed passageway. This radially directed passageway is preferably at or adjacent the end of the axial passageway close to the inlet so that fluid flows along the majority and possibly the whole of the length of the axial passageway with turns. As the plug moves further out of the cylinder sleeve, it exposes one or more further of such radially directed communication openings and hence flow through the device increases but the increased flow travels along a shorter length of the axial passageway and hence through fewer turns.

As with the previous embodiment, the cross-section of the axial passageways with turns may increase in the direction from inlet to outlet.

The cylinder and its sleeve are preferably tapered to ensure a good sealing fit and the taper is preferably from the inlet to the outlet end.

The cylinder and its sleeve may, if desired, be joined together, eg by brazing.

In both of the above described embodiments, there is preferably a plurality of the axial passageways with turns provided around the outer circumference of the plug or through the sleeve. For example, there may be from 2 to 12 such passageways, preferably from 4 to 8.

The axial passageways may be equi-spaced around the plug or sleeve but, in certain circumstances, it may be found advantageous to stagger them axially. By this means, particularly in the sleeve embodiment, the multiple passageways forming parallel flows can be arranged to provide a uniform Cv vs stroke and to minimise dead zones.

Devices of the invention are particularly suitable for use in circumstances of variable pressure drop.

Devices of the invention are also particularly useful for, although not limited to, application with valves of relatively small or intermediate capacity, eg of Cv's from 1 to 50.

They provide advantages of:

i) requiring fewer components than conventional multi-stage flow control devices;

ii) larger flow passages can be provided on smaller valves;

iii) the axial flow distributes the pressure drop along the length of the plug; and iv) the components may be made from stellites, carbides and a variety of other materials as they are relatively easy to machine e.g. by electro discharge milling.

BRIEF DESCRIPTION OF THE DRAWINGS

Embodiments of the invention will now be described by way of example only with reference to the accompanying drawings in which:

FIG. 5 is a section on line IV—IV of FIG. 4;

FIG. 6 is a view in the direction of arrow A of FIG. 5;

FIG. 7 is a diagrammatic representation of the flow paths through a device according to the invention; and FIG. 8 is a perspective view of a template used to make the flow passageways in the sleeve of FIG. 5.

DESCRIPTION OF THE PREFERRED EMBODIMENTS

Figure 1A:
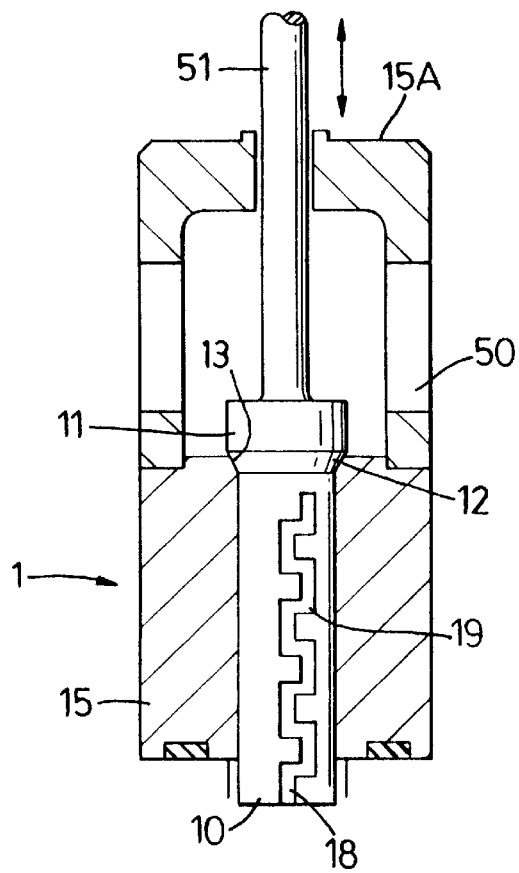
FIG. 1A is a part sectional view of a flow control device according to a first embodiment of the invention in its closed position.
Figure 1B:
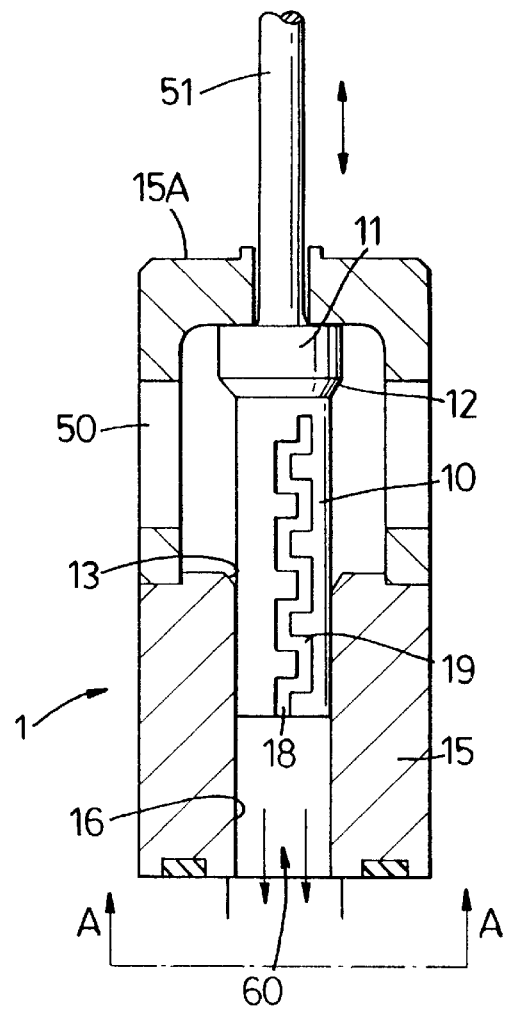
FIG. 1B is a similar view to FIG. 1A showing the device in one of its open positions.
Figure 2:
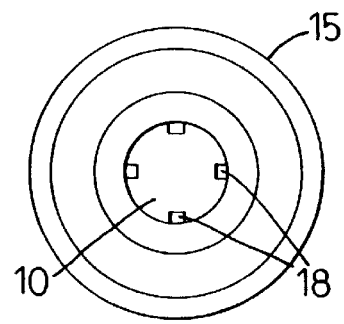
FIG. 2 is a view in direction A—A of FIG. 1B.

In FIGS. 1A, 1B and 2 the device 1 comprises a cylindrical plug 10 having a co-axially extending collar 11 of greater diameter than plug 10, said collar 11 having with an angled seating portion 12 adjacent plug 10.

Plug 10 is moveable axially by means of valve stem 51 within the bore 16 of an annular cylinder 15 which is provided with an annular seat 13 at its end adjacent to collar 11. Seating portion 12 of collar 11 co-operates with seat 13 to provide a fluid-tight cut-off for the device. Plug 10 is a close fit within cylinder 15 and extends through the end of the cylinder remote from seat 13.

The outer surface of plug 10 is provided with a plurality of axially-extending passageways 18. Only one passageway is illustrated in FIGS. 1A and 1B but FIG. 2 shows that there are four in this example. Each passageway is provided with a number of circumferentially extending right-angled turns 19, alternatively in one sense and then the other. By circumferentially we mean in a direction which at any point is substantially at right angles to a radius of the cylindrical plug.

The device has a fluid inlet 50 and a fluid outlet 60, said outlet 60 being formed by the end of cylinder 50 remote from the seat 13. In FIG. 1A, the device is shown with the plug 10 fully inserted in cylinder 15 and the seating portion 12 engaging the seat 12, thus preventing any flow of fluid through the device.

As the device is opened by movement of stem 51, an increasing length of plug 10 is exposed to fluid from inlet 50.

Depending upon the extent of the opening, more of the open sides of passageways 18 become exposed to fluid from inlet 50. The more the device is opened the less axial length of passageways 18 the fluid has to traverse before reaching the outlet 60. The fluid also passes through a smaller number of turns 19 in each passageway 18. In its fully open position, shown in FIG. 1B, the smallest axial length of passageways 18 and the lowest number of turns 19 are traversed by fluid passing through the valve, and hence the least amount of energy is removed from the fluid stream.

Conventional sealing means is provided between stem 51 and an end wall 15A above the cylinder 15 to ensure no escape of the fluid so that the fluid can only travel towards the outlet end of the plug.

Figure 3:
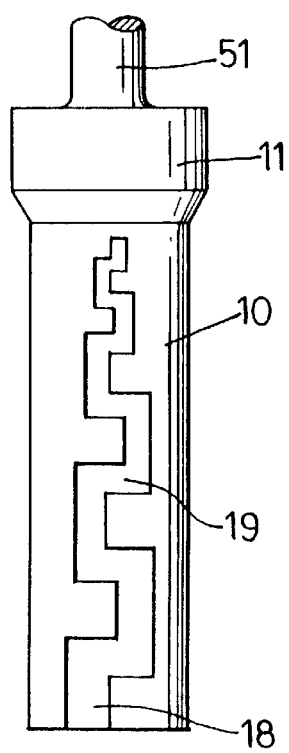
FIG. 3 is a view of the exterior surface of a plug forming part of the device shown in FIGS. 1A and 1B.

Passageways 18 may be designed so that they increase in cross-section, width and depth, as they extend from the inlet (collar) end of the plug 10 to the outlet end. An example of such a configuration for one passageway 18 is shown schematically in FIG. 3. In this case, as the plug 20 is withdrawn from cylinder 15 not only is the length of passageway 18 and the number of turns 19 through which fluid has to pass reduced, but the cross-sectional area of passageway 18 is increased, thereby further reducing the flow resistance to the fluid as the plug 20 is withdrawn. The area of path entry available for fluid flow varies as the plug is moved axially.

Figure 4:
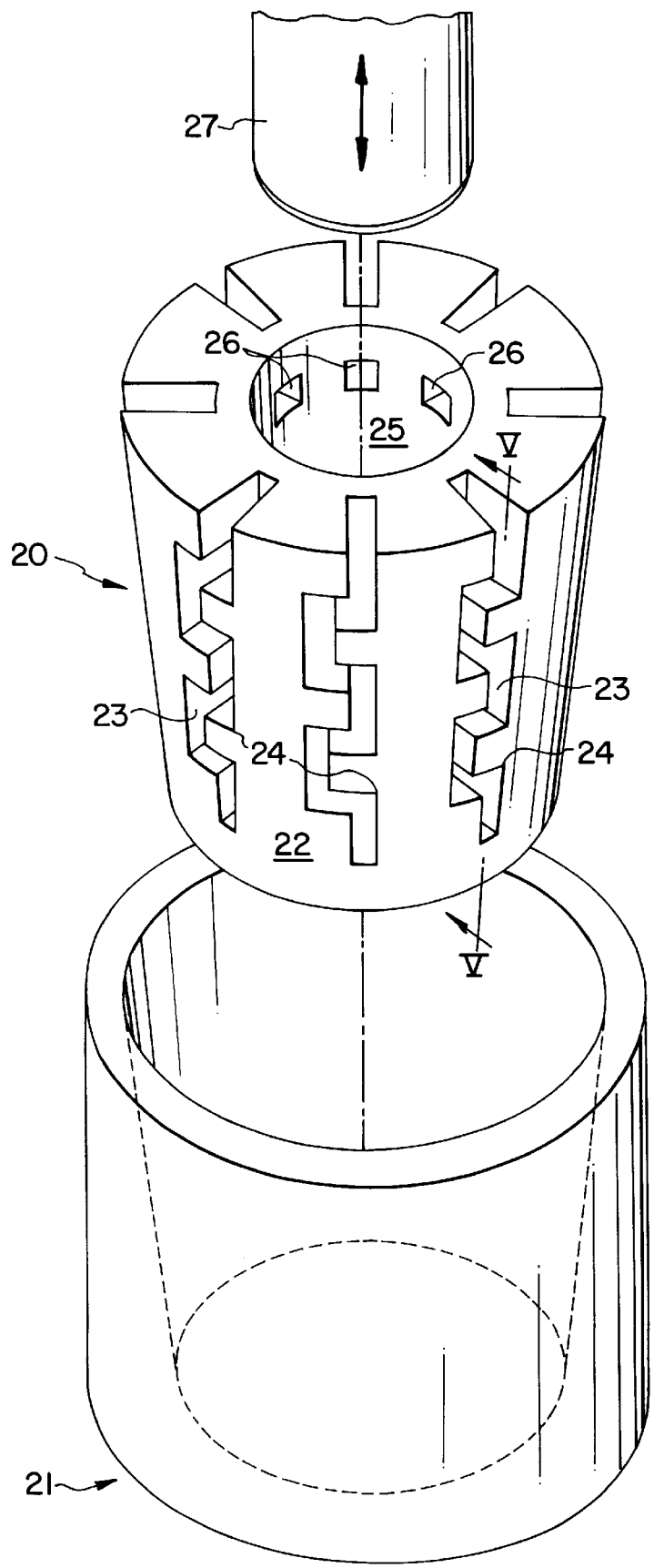
FIG. 4 is a perspective view of a cylinder and its sleeve which form part of a second embodiment of the invention.
Figure 4A:
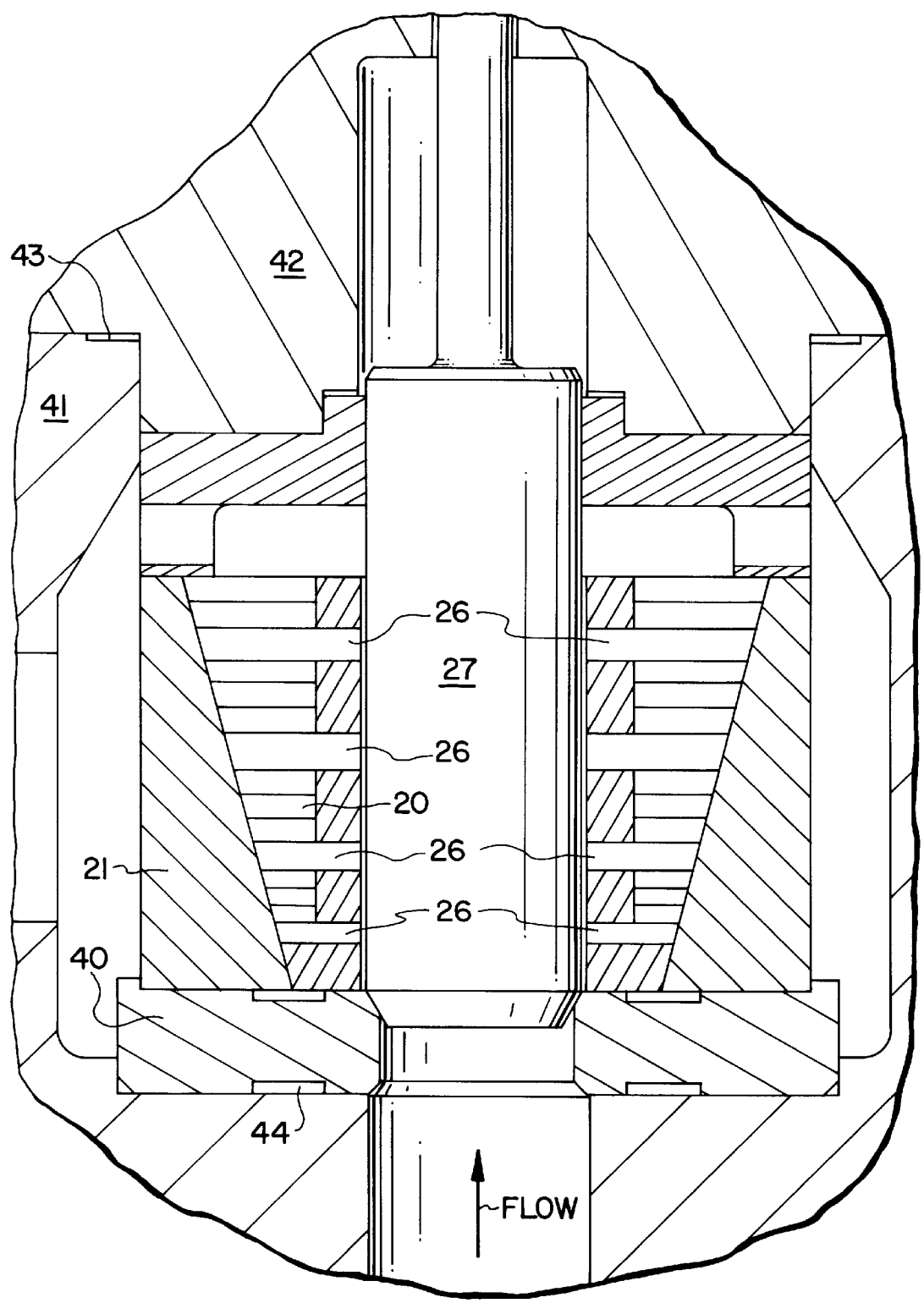

A second embodiment of the invention is shown in FIGS. 4 to 6.

In this embodiment the throttling, or flow resistance, is provided by passageways in an annular sleeve 20 which fits into the cylinder through which the plug is moveable.

The outer diameter of annular sleeve 20 decreases along the axial length of the sleeve, such that the sleeve has a smaller outer diameter at its end closest to the fluid inlet. The sleeve taper is matched by the internal taper of the external solid cylinder 21 into which sleeve 20 is fitted in fluid-tight manner. The inner diameter of sleeve 20 is constant, providing an interior bore 25 through which the cylindrical plug can move.

The outer surface 22 of sleeve 20 is provided with a series of axially-extending passageways 23, each passageway having a number of circumferentially extending (i.e. extending in a direction substantially at right angles to a radius of sleeve 20) right-angled turns 24. Each passageway 23 communicates with the interior bore 25 of the inner annulus via a plurality of axially-spaced and radially directed openings 26 extending through the thickness of the sleeve.

To open flow, the plug is lifted and moved out of the sleeve 20 sufficiently to expose the uppermost opening 26 in each passageway 23. Fluid can then flow the entire length of each passageway 23 to the outlet and hence negotiates all the right angle turns. As the plug is moved further out of the sleeve 20, successive openings 26 along each passageway are exposed so that flow increases but the flow through each successive opening then negotiates fewer turns along each passageway 23. The area of path entry available for fluid flow is thus varied as the plug is moved axially.

Moreover, as shown in FIG. 6, each passageway 23 increases in cross-section from its inlet end 23a to its outlet end 23b, thereby further increasing flow as the plug moves further out of the sleeve 20. The radially directed openings or passageways 26 towards the outlet end of the device may also have a greater cross-sectional area than those towards the inlet end.

This is illustrated diagrammatically in terms of flow resistance in FIG. 7 where plug 27 exposes more or less openings 26 leading to turns 24 in passageway 23 as it is moved up or down.

FIG. 8 shows a template 30 with which a passageway 23 with turns 24 can be cut, e.g. electro-discharge milled, into the outer surface of sleeve 20 while also cutting the openings 26 through the wall thickness of the annulus.

The template has an elongated body 31, shaped to correspond to passageways 23, with right-angled turns 32 corresponding to turns 24. It is of depth "x" corresponding to the desired depth of passageway 23 (so that "x" may vary along the length of the body 31, if desired) and has extensions 33 corresponding to the desired communication openings 26 in sleeve 20. The depth "y" of body 31, including an extension 33, is equal to the wall thickness of sleeve 20.

I claim:

1. A fluid flow control device comprising a plug and cylinder arrangement, the cylinder being annular and the plug being cylindrical and moveable axially within said cylinder, a fluid inlet co-operating with one end of said cylinder, a fluid outlet co-operating with the other end of said cylinder, a fluid flow path extending axially through the plug and cylinder arrangement and having a path entry of variable area, said cylinder comprising an inner annulus and an outer annulus, the inner annulus being a sealing fit inside the outer annulus, the fluid flow path being provided as passageways formed as axially-extending channels in the outer surface of said inner annulus, said passageways communicating at a plurality of openings along their length with the interior of said inner annulus, said fluid flow path having a plurality of circumferentially extending angular turns, and operating means for axially moving the plug relative to the cylinder, the arrangement being such that as the plug is moved axially the length of the fluid flow path is varied.

2. A fluid flow control device as claimed in claim 1 in which the area of path entry available for fluid flow is varied as the plug is moved axially.

3. A fluid flow control device as claimed in claim 2 in which the fluid flow path has an increasing cross-sectional area as it extends axially through the plug and cylinder arrangement.

4. A fluid flow control device as claimed in claim 1 in which at least one of the passageways comprising the fluid flow path has a plurality of substantially right-angled turns.

5. A fluid flow control device as claimed in claim 1 in which the outer wall of the inner annulus and the inner wall of the outer annulus are tapered.

6. A fluid flow control device as claimed in claim 1 in which the cylindrical plug is substantially solid.

7. A fluid flow control device as claimed in claim 1 including closure means associated with the plug and cylinder for enabling fluid flow through the device to be stopped off.

* * * * *